United States Patent
Karunadasa et al.

(10) Patent No.: US 10,272,384 B2
(45) Date of Patent: Apr. 30, 2019

(54) REVERSIBLE AND IRREVERSIBLE CHEMISORPTION IN NONPOROUS, CRYSTALLINE HYBRID STRUCTURES

(71) Applicant: The Board of Trustees of the Leland Stanford Junior University, Palo Alto, CA (US)

(72) Inventors: Hemamala I. Karunadasa, Palo Alto, CA (US); Diego Solis-Ibarra, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 235 days.

(21) Appl. No.: 14/916,821

(22) PCT Filed: Sep. 5, 2014

(86) PCT No.: PCT/US2014/054363
§ 371 (c)(1),
(2) Date: Mar. 4, 2016

(87) PCT Pub. No.: WO2015/035216
PCT Pub. Date: Mar. 12, 2015

(65) Prior Publication Data
US 2016/0193566 A1    Jul. 7, 2016

Related U.S. Application Data

(60) Provisional application No. 61/874,944, filed on Sep. 6, 2013.

(51) Int. Cl.
*B01D 53/68* (2006.01)
*B01D 53/82* (2006.01)
(Continued)

(52) U.S. Cl.
CPC ......... *B01D 53/685* (2013.01); *B01D 53/02* (2013.01); *B01D 53/82* (2013.01); *B01J 20/027* (2013.01);
(Continued)

(58) Field of Classification Search
CPC .. B01J 20/0237; B01J 20/0255; B01J 20/027; B01J 20/22; B01J 20/223; B01J 20/28014; B01J 2220/46
See application file for complete search history.

(56) References Cited

U.S. PATENT DOCUMENTS 5,882,548 A    3/1999  Liang et al.
6,150,536 A *  11/2000 Chondroudis ....... C07D 333/18
                                                            117/68
(Continued)

OTHER PUBLICATIONS

Espallargas, er al., "Reversible Gas Uptake by a Nonporous Crystalline Solid Involving Multiple Changes in Covalent Bonding," *Journal of the American Chemical Society*, 2007, pp. 15606-15614, vol. 129(50). [retrieved on Oct. 23, 2014] Retrieved from the Internet URL:http://pubs.acs.org/doi/abs/10.1021/ja075265t. abstract.
(Continued)

*Primary Examiner* — Ngoc-Yen Nguyen
(74) *Attorney, Agent, or Firm* — Womble Bond Dickinson (US) LLP

(57) ABSTRACT

A sorbent in the form of a layered, non-porous perovskite is provided, wherein the sorbent can include parallel, alternating layers of an organic layer, including an ordered array of organic moieties capable of reacting with a gaseous halogen, and an inorganic layer, including a metal-halide sheet. Furthermore, each organic layer can be sandwiched between inorganic layers. Methods for capturing one or more halogens from a gas stream are also provided, wherein the methods can include contacting a gas stream with a sorbent in the form of a layered, non-porous perovskite, wherein the
(Continued)

sorbent can include parallel, alternating layers of an organic layer, including an ordered array of organic moieties capable of reacting with a gaseous halogen, and an inorganic layer, including a metal-halide sheet. One or more halogens in the gas stream can react with either alkyne groups or alkene groups found in the organic layer of the sorbent.

35 Claims, 6 Drawing Sheets

(51) Int. Cl.
| | |
|---|---|
| *B01J 20/22* | (2006.01) |
| *B01J 20/28* | (2006.01) |
| *B01J 20/02* | (2006.01) |
| *B01D 53/02* | (2006.01) |

(52) U.S. Cl.
CPC ....... *B01J 20/0237* (2013.01); *B01J 20/0255* (2013.01); *B01J 20/22* (2013.01); *B01J 20/223* (2013.01); *B01J 20/28014* (2013.01); *B01D 2253/112* (2013.01); *B01D 2253/20* (2013.01); *B01D 2253/25* (2013.01); *B01D 2257/202* (2013.01); *B01D 2257/2022* (2013.01); *B01D 2257/2025* (2013.01); *B01D 2257/2027* (2013.01); *B01J 2220/46* (2013.01)

(56) References Cited

U.S. PATENT DOCUMENTS

| 6,364,938 | B1 | 4/2002 | Birbara et al. |
| 6,429,318 | B1* | 8/2002 | Mitzi ................ H01L 21/31691 |
| | | | 117/68 |
| 2002/0124790 | A1 | 9/2002 | Masanao |
| 2003/0096902 | A1* | 5/2003 | Takeoka .................. C08F 38/02 |
| | | | 524/534 |
| 2003/0170918 | A1* | 9/2003 | Dehaven ............. H01L 51/0002 |
| | | | 438/3 |
| 2010/0132547 | A1 | 6/2010 | Masel et al. |
| 2011/0124840 | A1 | 5/2011 | Breitenkamp et al. |

OTHER PUBLICATIONS

Solis-Ibarra, et al., "Reversible and Irreversible Chemisorption in Nonporous-Crystalline Hybrids," *Angewandte Chemie (International Ed. In English)*, 2014, pp. 1039-1042, vol. 53(4). [retrieved on Oct. 24, 2014] Retrieved from the Internet URL:http://web.stanford.edu/group/karunadasalab/publications/paper1.pdf. entire document.

* cited by examiner

REVERSIBLE AND IRREVERSIBLE CHEMISORPTION IN NONPOROUS, CRYSTALLINE HYBRID STRUCTURES

CROSS-REFERENCE TO RELATED APPLICATIONS

The present application is a U.S. National Stage entry of International Patent Application PCT/US2014/054363, filed Sep. 5, 2014, which claims priority to U.S. Provisional Patent Application No. 61/874,944, filed Sep. 6, 2013, the disclosure of which is incorporated herein by reference in its entirety.

FIELD OF INVENTION

The present invention relates to nonporous, crystalline hybrid structures capable of reversible and/or irreversible chemisorption, and in particular, to nonporous, crystalline hybrid structures capable of capturing gaseous halogens. The invention is further directed to methods of capturing, and in certain cases, releasing targeted halogens.

BACKGROUND

Sorbents are materials that are widely used for the capture of various small molecules, e.g., from gas streams. For example, nuclear power plants release radioactive iodine isotopes during the final oxidation of uranium and plutonium fission products. Iodine in cooled spent nuclear fuel consists of approximately a 3:1 isotopic ratio of $^{129}$I:$^{127}$I. While $^{127}$I is a stable isotope, $^{129}$I emits beta and gamma radiation with a half-life of 10 million years. Due to its long half-life and extreme mobility in the environment $^{129}$I is likely to be the radionuclide with the greatest long-term environmental impact. The nuclear power plant waste streams generally contain, in addition to about 20-60 ppm iodine, 0.1% $NO_x$ gases, and high levels of water vapor. Accordingly, for disposal through nuclear transmutation or for long-term sequestration, selective and inexpensive capture materials are required.

Most sorbents generally used for gas capture are porous materials where selectivity is achieved through pore size discrimination, wherein cavities are matched in size with the guest molecules. In other approaches for gas capture, materials comprising pores with substrate-binding sites or flexible pore walls are utilized. See, e.g., L. J. Murray et al., *Chem. Soc. Rev.* 2009, 38, 1294-1314; and S. Horike et al., *Nature Chem.* 2009, 1, 695-704. In the particular context of iodine disposal/sequestration described above, porous silver-impregnated zeolites can trap iodine as silver iodide with a gravimetric capacity upper limit of about 33 wt %. See, e.g., B. R. Westphal et al., *Mater. Res. Soc. Symp. Proc.* 2010, 1265, AA02-04; and K. W. Chapman et al., *J. Am. Chem. Soc.* 2010, 132, 8897-8899. Due to their porosities, porous sorbents typically have relatively high volumes and are not desirable where sorbent space is advantageously minimized (e.g., in the case of iodine disposal/sequestration).

Non-porous materials have not been widely investigated for gas capture/storage applications due to the obvious lack of void space, although examples of nonporous coordination polymers and organic-molecular crystals that can store volatile molecules are known. See, e.g., G. Minguez Espallargas et al., *J. Am. Chem. Soc.* 2007, 129, 15606-15614; S. Libri et al., *Angew. Chem.* 2008, 120, 1717-1721; *Angew. Chem. Int. Ed.* 2008, 47, 1693-1697; C. J. Adams et al., *Angew. Chem.* 2007, 119, 1142-1146; *Angew. Chem. Int. Ed.* 2007, 46, 1124-1128; J. L. Atwood et al., *Science* 2002, 296, 2367-2369; J. L. Atwood et al., *Science* 2002, 298, 1000-1002; and J. L. Atwood et al., *Angew. Chem.* 2004, 116, 3008-3010; *Angew. Chem., Int. Ed.* 2004, 43, 2948-2950. However, such materials generally are not recognized as providing significant capacity for captured molecules.

It would be beneficial to provide non-porous structures capable of functioning as reversible and/or irreversible gas capture sorbents that function based on chemical reactivity with the gas(es) to be captured.

SUMMARY OF THE INVENTION

The present invention relates to synthesized non-porous solids ("hybrid perovskites") that can capture specific small molecules such as halogens (e.g., chlorine, bromine, and/or iodine) from gas streams. Advantageously, such solids are able to capture such small molecules with high gravimetric and volumetric capacities. Selectivity for halogens is based on chemical reactivity and the perovskites can be tailored for the capture of one or more specific small molecules (such as one or more specific halogens). After capture, the hybrid perovskites can also, in certain embodiments, be tuned for timed release of one or more of the captured small molecules associated therewith. This capability allows for easy regeneration of the hybrid perovskite and allows such materials to be used in applications which require transport and subsequent release of one or more small molecules. These hybrid perovskites can also, in some embodiments, separate different small molecules (e.g., two or more halogens) with similar chemical properties for applications which require a high purity of one small molecule (e.g., one halogen).

In one aspect, a sorbent in the form of a layered, non-porous perovskite is provided, wherein the sorbent can comprise parallel, alternating layers of an organic layer, comprising an ordered array of organic moieties capable of reacting with a gaseous halogen, and an inorganic layer, comprising a metal-halide sheet. Furthermore, each organic layer can be sandwiched between inorganic layers. In various embodiments, the sorbent can be in the form of a powder or a thin film. Methods for capturing one or more halogens from a gas stream are also provided herein, wherein the gas stream can be contacted with any embodiments of the sorbent described herein.

In various embodiments, the metal of the inorganic layer can be selected from the group consisting of Pb, Cu, Mn, Co, Ni, Sn, Fe, and Ge. In addition, the halide can be selected from the group consisting of Cl, Br, and I, for example. For example, in certain embodiments, the metal-halide sheet can comprise $[PbBr_4]^{2-}$ units.

The organic moieties of the sorbent can comprise ammonium ions, for example. In various embodiments, the organic moieties of the sorbent can comprise alkyne groups. For example, the organic moieties can comprise but-3-yn-1-ammonium (BYA) ions. In some embodiments, the alkyne groups are capable of reacting with the gaseous halogen by the formation of covalent bonds. For example, in certain embodiments, the alkyne groups are capable of reacting with gaseous $I_2$ by the formation of covalent C—I bonds.

In various embodiments, the organic moieties of the sorbent can comprise alkene groups. For example, the organic moieties can be selected from the group consisting of but-3-en-1-ammonium (BEA) ions, prop-2-en-1-ammonium (PEA) ions, and combinations thereof. In some embodiments, the alkene groups can be capable of reacting with the gaseous halogen by the formation of dihaloalkanes.

For example, the alkene groups can be capable of reacting with gaseous $I_2$ by the formation of diiodoalkanes. In some embodiments, the alkene groups can be capable of reacting with gaseous $Br_2$ by the formation of dibromoalkanes.

In certain embodiments, the perovskite can be selected from the group consisting of $(BYA)_2[PbBr_4]$, $(BEA)_2[PbBr_4]$, $(BEA)_2[PbCl_4]$, $(PEA)_2[PbBr_4]$, $(PEA)_2[CuCl_4]$, $(CH_3NH_3)[PbI_3]$, $(MA)[PbI_3]$, and $(MA)[PbBr_3]$. The sorbent of the present invention can be stable at temperatures up to about 240° C. In addition, the sorbent can be stable at relative humidity levels from 0 to about 75% at 50° C. over at least a 24-hour period of time, for example.

In another aspect of the present invention, a method for irreversibly capturing gaseous iodine from a gas stream is provided. The method can comprise contacting a gas stream comprising gaseous iodine with a sorbent in the form of a layered, non-porous perovskite, comprising parallel, alternating layers of an organic layer, comprising an ordered array of organic moieties, wherein the organic moieties comprise alkyne groups, and an inorganic layer, comprising a metal-halide sheet, wherein each organic layer is sandwiched between inorganic layers, and wherein the gaseous iodine in the gas stream reacts with the alkyne groups to form covalent C—I bonds. In certain embodiments, the organic moieties can comprise but-3-yn-1-ammonium (BYA) ions. In some embodiments, the gas stream can comprise a spent nuclear gas waste stream and the gaseous iodine comprises the $^{129}I$ radionuclide, for example.

In various embodiments, the capture of the gaseous iodine can result in an expansion of the perovskite such that a distance between successive inorganic layers is increased. For example, the distance between successive inorganic layers can increase about 20 to about 40 percent following reaction between the gaseous iodine in the gas stream and the alkyne groups. In addition, unit cell volume of the perovskite can increase by at least about 20 percent or at least about 30 percent following reaction between the gaseous iodine in the gas stream and the alkyne groups. For example, unit cell volume of the perovskite can increase by about 20 to about 40 percent following reaction between the gaseous iodine in the gas stream and the alkyne groups.

A method for capturing one or more halogens from a gas stream is also provided herein, wherein the method can comprise contacting a gas stream comprising one or more halogens with a sorbent in the form of a layered, non-porous perovskite, comprising parallel, alternating layers of an organic layer, comprising an ordered array of organic moieties, wherein the organic moieties comprise alkene groups capable of reacting with one or more gaseous halogens, and an inorganic layer comprising, a metal-halide sheet, wherein each organic layer is sandwiched between inorganic layers. Furthermore, one or more of the halogens in the gas stream can react with the alkene groups to form dihaloalkanes.

In various embodiments, the organic moieties can be selected from the group consisting of but-3-en-1-ammonium (BEA) ions, prop-2-en-1-ammonium (PEA) ions, and combinations thereof. In some embodiments, the gas stream can comprise iodine and the dihaloalkanes comprise diiodoalkanes. In certain embodiments, the gas stream can comprise bromine and the dihaloalkanes comprise dibromoalkanes.

In some embodiments, the gas stream can comprise both iodine and bromine, and the alkene groups can react with both iodine and bromine to reversibly form diiodoalkanes and to irreversibly form dibromoalkanes and bromoiodoalkanes. In addition, the method can further comprise outputting a gas, following the contacting step, that comprises a lower overall mole percentage of bromine and a higher overall mole percentage of iodine with respect to the gas stream, for example.

In various embodiments, the capture of the one or more halogens results in an expansion of the perovskite such that a distance between successive inorganic layers is increased following reaction between the gaseous halogens in the gas stream and the alkene groups. For example, the distance between successive inorganic layers can increase by about 15 to about 40 percent following reaction between the gaseous halogens in the gas stream and the alkene groups.

In various embodiments, at least a portion of the captured iodine can be released from the perovskite. Furthermore, the half-lives for iodine release from the perovskites can be changed through changes to the crystal structure. For example, the half-life for release of the captured iodine from the perovskite can be changed from about 3 hours (e.g., $(PEA-I_2)_2[PbBr_4]$) to about 3 days (e.g., $(BEA-I_2)_2[PbBr_4]$) through changes to the crystal structure. Accordingly, the perovskites can be tailored to exhibit iodine release within this range (i.e., about 3 hours to about 3 days).

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

In order to assist the understanding of embodiments of the invention, reference will now be made to the appended drawings, which are not necessarily drawn to scale. The drawings are exemplary only, and should not be construed as limiting the invention.

DETAILED DESCRIPTION OF THE PREFERRED EMBODIMENTS

The present inventions now will be described more fully hereinafter with reference to the accompanying drawings. The invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

As described herein, embodiments of the disclosure relate to nonporous, crystalline hybrid structures ("hybrid perovskites"). Generally, such structures comprise organic and inorganic components in a single phase, arranged in a well-defined, layered assembly. Typically, these assemblies comprise two-dimensional metal-halide inorganic sheets sandwiching layers comprising ordered arrays of organic compounds. More specifically, hybrid perovskites generally consist of layers of two-dimensional anionic coordination polymers comprising corner-sharing metal halide octahedra alternating with layers of ordered arrays of organic cations, forming close-packed structures.

The components in the hybrid perovskites provided herein can be described by the chemical formula A$_2$BX$_4$, wherein A is an organic compound, B represents an inorganic compound, and X is a halogen. As will be described further herein, the organic compound(s), inorganic compound(s), and halogen(s) comprising the non-porous, hybrid perovskite structures provided can vary and can impact the properties and functionality of the hybrid perovskite (e.g., with regard to gas capture).

Figure 1:
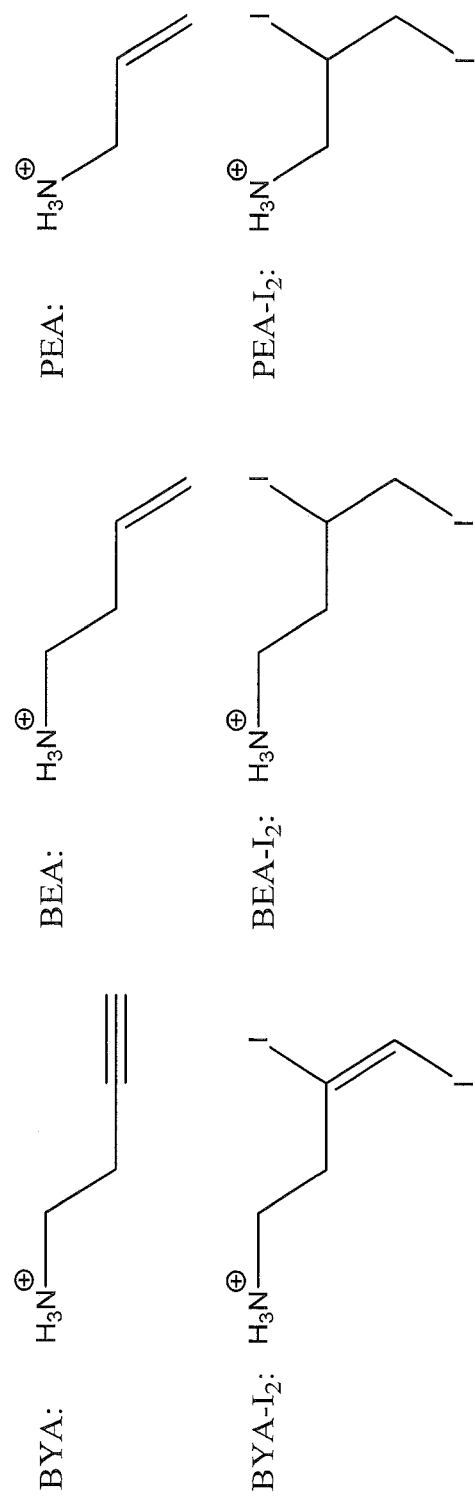
FIG. 1 provides chemical structures and abbreviations of organic cations used in various embodiments of the present invention.

Organic compounds of particular interest for incorporation within the perovskites described herein include those with different functionalities that allow for reaction with gases to be captured (e.g., various small molecules such as I$_2$, Cl$_2$, Br$_2$, NOx SOx, CO, and/or CO$_2$). In one particular embodiment, alkene and/or alkyne groups are incorporated, which react, e.g., with halides. Exemplary organic components that can be incorporated within the perovskite structures include, but are not limited to, the organic cations depicted in FIG. 1. Exemplary components that can be included within the inorganic layers of the perovskites include, but are not limited to, metals (e.g., Pb, Cu, Mn, Co, Ni, Sn, Fe, Ge) and halides (e.g., Cl, Br, I). Generally, various hybrid perovskites described herein can provide materials exhibiting molecular reaction centers while affording the superior thermal and mechanical properties of solids.

In various embodiments, the organic components are capable of solution state self-assembly and provide a relatively strong interaction between the layers while the inorganic components fit within the organic layers. It should be further appreciated that perovskites described herein can be formed at much lower temperatures than the purely inorganic material making up the perovskite. The synthesis of hybrid perovskites can, in some embodiments, be conducted at ambient temperature and pressure in aqueous solutions, as exemplified in the Experimental Section herein, and the syntheses are easily scalable. In certain embodiments, the inorganic material is a non-toxic material. The morphology of the perovskites can be varied (e.g., microcrystalline powders and oriented thin films). Further, the physical properties can be tailored (e.g., to provide materials that are robust to high humidity levels and temperatures (e.g., up to 240° C.) or to provide materials that are water soluble).

The organic and inorganic components in the hybrid perovskites described herein can serve distinct roles in enabling reactivity localized between inorganic sheets. These hybrid perovskites can, in certain embodiments, reversibly and/or irreversibly capture gaseous halogens. In various embodiments, one or both of the inorganic layer and the organic layer can play a role in the capture of materials (e.g., halogens) from vapor streams. The functional groups in the organic molecules can react with gaseous molecules (e.g., halogens) to form covalent bonds, e.g., carbon-halogen bonds. The inorganic sheets can, in some embodiments, provide thermal, mechanical, and moisture stability, provide selectivity for halogens over other reactive small molecules such as NOx gases, and/or allow the use of crystal engineering to tune the hybrid perovskites for time release capture of halogens.

Following capture of small molecules within the hybrid perovskite structure, the inorganic template is advantageously preserved. The capture of small molecules within this structure leads to expansion of the materials primarily in only one direction (including solely in one direction), which can lead to unprecedented volume increases (e.g., up to about 36%), while still maintaining the layered structure. For example, in certain embodiments, the hybrid perovskite structure can expand in volume up to about 20%, up to about 30%, or up to about 36%, such as between about 10% and about 36%, between about 15% and about 36%, between about 20% and about 36%, between about 25% and about 36%, or between about 30% and about 36%. A reversible volume expansion upon solvent intercalation has been reported in layered perovskite structures (See, e.g., D. B. Mitzi, D. R. Medeiros, P. R. L. Malenfant, *Inorg. Chem.* 2002, 41, 2134-2145); however, as described herein, it has been surprisingly shown that this volume expansion can result from inducing reactivity in the organic layers of a hybrid perovskite structure.

Various embodiments provide hybrid perovskites capable of reversibly and/or irreversibly capturing one or more small molecules. It should be appreciated that while a number of embodiments refer to iodine, the embodiments described herein may be extended to any suitable halogen in addition to or in place of iodine.

In certain embodiments, hybrid perovskites are provided which can irreversibly capture iodine and/or other halogen(s). With irreversible capture, the small molecules captured within the hybrid perovskite structure are not released under typical operating conditions. For example, in some such embodiments, the captured halogen(s) will not be released until the nonporous solid is treated (e.g., heated). In some embodiments, the hybrid perovskites can allow for the selective, irreversible capture of iodine and/or other halogen(s).

Certain hybrid perovskites that can irreversibly capture iodine vapor include hybrid perovskites containing alkyne groups in the organic layers. Terminal alkynes form diiodoalkenes with elemental iodine and thus, such perovskites can function to irreversibly capture iodine vapor by forming covalent C—I bonds within the organic layers. In certain such embodiments, gravimetric capacities for the capture of iodine vapor are comparable to the highest values reported for porous structures. Reaction with iodine vapor can result in a remarkable, unexpected expansion of the non-porous, hybrid perovskite materials. Advantageously, crystallinity can be retained while forming new covalent C—I bonds within the organic layer of the hybrid perovskites described herein. As noted above, the expansion of the perovskite materials due to the capture of iodine vapor can be up to 36% of the original volume of the hybrid perovskite structure.

Figure 2:
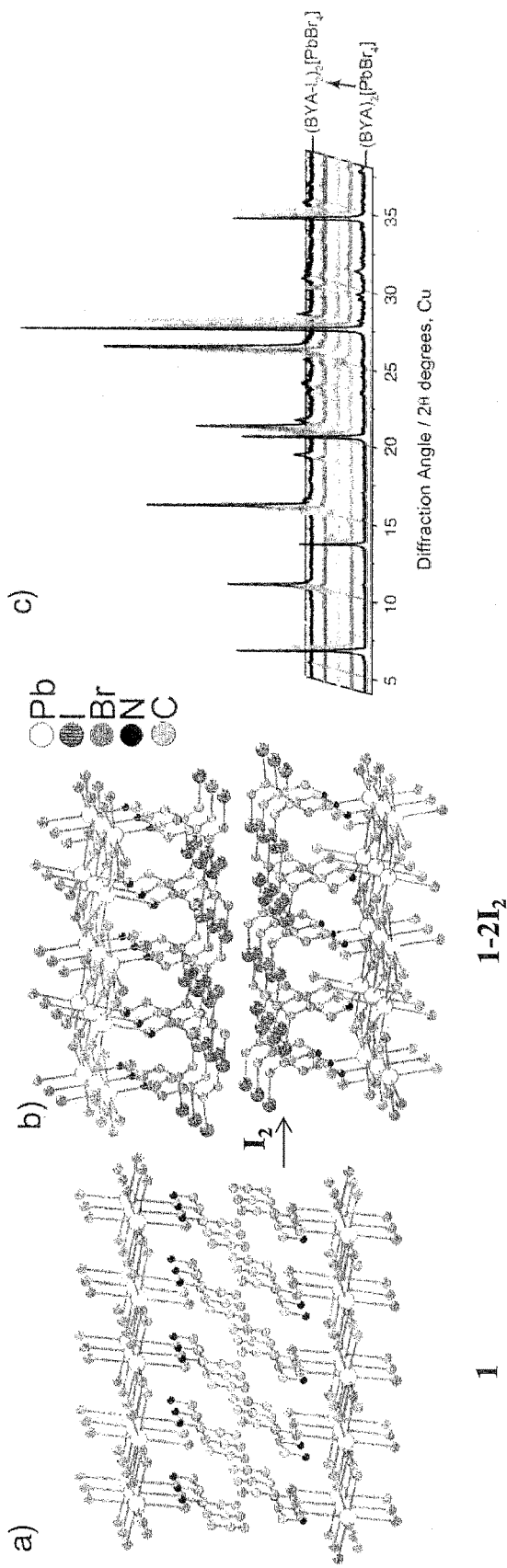
FIG. 2a) is a representation of the X-ray structure of $(BYA)_2[PbBr_4]$ (1), with hydrogen atoms omitted for clarity.
FIG. 2b) is a representation of the X-ray structure of the reaction product of 1 with iodine $((BYA-I_2)_2[PbBr_4]$ (1-$2I_2$))
FIG. 2c) provides powder x-ray diffraction patterns of an oriented film of 1 after various exposure times to iodine vapor, showing conversion to 1-$2I_2$.

As shown in FIG. 2a, for example, alkyne-ammonium groups in the hybrid perovskite $(BYA)_2[PbBr_4]$ (1) form a close-packed, partially interdigitated bilayer. A probe radius of 0.8 Å shows a solvent-accessible volume of only 1.2 Å$^3$ or 0.1% of the unit cell. However, exposure of this solid to iodine vapor results in a dramatic expansion of the spacing between the inorganic sheets as iodine is incorporated into the organic layers through the irreversible formation of BYA-$I_2$ bonds. See, for example, FIG. 2b. Although not intending to be limited by theory, it is believed that this reaction of hybrid perovskite $(BYA)_2[PbBr_4]$ (1) with iodine vapor proceeds via a topotactic transformation that preserves the layered structure of the hybrid perovskite. The inorganic template maintained in the crystalline product restricts expansion in the direction of the crystallographic a and b axes and the unit cell expands almost exclusively in the direction of the crystallographic c axis (corresponding to the distance between inorganic sheets). Remarkably, and as illustrated in Table 1 below, the c axis of this perovskite expands by about 38% and the unit-cell volume increases by about 36% when iodine vapor is incorporated, as compared with the parent structure, while retaining a high degree of crystallinity.

TABLE 1

Unit-cell parameters for $(BYA)_2[PbBr_4]$ and $(BYA-I_2)_2[PbBr_4]$

|  | $(BYA)_2$ $[PbBr_4]$ (1) | $(BYA-I_2)_2$ $[PbBr_4]$ $(1-2I_2)$ | Difference |
|---|---|---|---|
| space group | P2$_1$/c | P-1 |  |
| a (Å) | 7.819(1) | 7.982(1) | 0.163 |
| b (Å) | 8.396(1) | 8.142(1) | −0.254 |
| c (Å) | 12.808(1) | 17.630(1) | 4.822 |
| alpha (°) | 90 | 88.425(2) | −1.575 |
| beta (°) | 93.504(2) | 85.355(2) | −1.141[a] |
| gamma (°) | 90 | 89.868(2) | −0.132 |
| volume (Å$^3$) | 838.2(1) | 1141.6(2) | 303.4 |

[a]The supplementary angle of $(BYA)_2[PbBr_4]$ (1) was used for this calculation to account for differences in space group conventions.

The $(BYA-I_2)_2[PbBr_4]$ perovskite (1-2$I_2$, FIG. 2b) affords a gravimetric capacity of 43 wt % (0.43 g of $I_2$ per 1 g of 1-2$I_2$) and a volumetric capacity of 1.48 g/cm$^3$ (1.48 g of $I_2$ per 1 cm$^3$ of 1-2$I_2$). These values are comparable to the highest gravimetric capacities reported for porous iodine storage materials of 64 and 55 wt % for Cu- and Zn-based metal-organic frameworks respectively. See, D. F. Sava, K. W. Chapman, M. A. Rodriguez, J. A. Greathouse, P. S. Crozier, H. Zhao, P. J. Chupas, T. M. Nenoff, *Chem. Mater.* 2013, 25, 2591-2596; and D. F. Sava, M. A. Rodriguez, K. W. Chapman, P. J. Chupas, J. A. Greathouse, P. S. Crozier, T. M. Nenoff, *J. Am. Chem. Soc.* 2011, 133, 12398-12401. The reported capacities were recalculated as wt %=mass of iodine/(mass of iodine+mass of capture material) for ease of comparison. Based also on these calculations, these nonporous hybrid perovskites show comparable or significantly higher volumetric capacities than certain porous frameworks.

Iodine-saturated atmospheres at various temperatures can be used to determine that 1 can capture iodine at partial pressures ranging from 39-1350 ppm. Samples of 1 remain as crystalline solids at relative-humidity levels from 0 to 75% at 50° C. over at least a 24-hour period and are stable for months at ambient temperature and humidity. In contrast, solid (BYA)Cl deliquesces at relative-humidity levels as low as 11% and the neutral amine is a liquid. Dissolved BYA rapidly reacts with NO and $NO_2$ to form reactive nitroalkenes that yield a variety of products. See, e.g., B. R. Brown, in *The Organic Chemistry of Aliphatic Nitrogen Compounds*, Oxford University Press, Oxford, 1994, 470-484. A 24-hour exposure of 1 to an iodine-saturated atmosphere (P($I_2$)=0.30 torr, 390 ppm) containing 1% of $NO_2$, led to a decrease in iodine-capture capacity of ca. 10%. Capacity losses ranging from 15-65% upon exposure to an iodine-saturated atmosphere containing $NO_2$ have been reported for capture materials such as zeolites, mesoporous silica, and layered-double hydroxides. See, e.g., Y. Wang, et al., *Development of a New Generation of Waste Form for Entrapment and Immobilization of Highly Volatile and Soluble Radionuclides* 2010, Sandia National Laboratories.

The inorganic sheets of the hybrid perovskites also increase the thermal stability of the molecules. Thermogravimetric analyses show a mass loss at 190° C. for 1; a temperature higher than that of (BYA)Cl by 50° C. The compact lead-bromide sheets can also significantly attenuate the beta and gamma emissions from $^{129}$I compared to the organic components alone. Studies indicate that the alkyne hybrids could be used to capture radioactive iodine in a soft organic matrix to generate stable and compressible materials for long-term storage.

In some embodiments, hybrid perovskites are provided which can reversibly capture iodine and/or other halogen(s). Timed-release capture materials (wherein capture and/or release properties can be tailored) can, in some embodiments, allow for inexpensive regeneration and for sustained release of substrates. Reversible chemisorption in hybrid perovskites as described herein allows for capture, separation, and release of substrates based on chemical reactivity and not size. These nonporous—yet responsive—hybrid materials open traditional solid-state structures to the tools of molecular synthesis.

For example, hybrid perovskites containing alkene groups in the organic layers can exhibit the unusual feature of reversible chemisorption. Terminal alkenes form diiodoalkanes with elemental iodine and thus, such perovskites can function to reversibly chemisorb iodine to form diiodoalkanes. The reversible iodination of alkene molecules in hybrid perovskites is an intriguing example of gas capture through reversible chemisorption where the equilibrium for iodine release can be tuned through molecular design. In various embodiments, solid-state interactions can extend the lifetime of iodinated molecules that cannot be isolated in solution and can be used to tune the materials for timed iodine release. For example, the half-lives of diiodoalkane perovskites can be increased from 3 hours to 3 days by using solid-state packing effects. These hybrid perovskites can offer a new platform for substrate capture and controlled release driven by chemical reactivity.

For example, lead-bromide perovskites containing alkene groups in the organic layers are examined. Generally, reaction of terminal alkenes with iodine results in reversible addition to form the vicinal diiodoalkane. In solution, the equilibrium is displaced towards the alkene, with half-lives for the diiodoalkanes ranging from 0.075 to 1.2 hours. See, e.g., K. W. Field et al., *J. Chem. Ed.* 1987, 64, 269-271, which is incorporated herein by reference. The alkene perovskite $(PEA)_2[PbBr_4]$ (2) shows an elongation of the c axis by 17% upon iodination, to form a new layered hybrid with diiodoalkane molecules: $(PEA-I_2)_2[PbBr_4]$ (2-2$I_2$). Iodine addition across the C=C bonds is corroborated by vibrational spectroscopy that reveals a decrease in intensity of the C=C stretch at 1646 cm$^{-1}$. Surprisingly, this new phase reverts to the starting alkene material over 24 hours at 25° C. This expansion-contraction of the unit cell upon reaction with iodine can be repeated at least five times, even in the presence of moisture, with no loss of crystallinity. The half-life of the diiodoalkane hybrid can be estimated from the x-ray powder pattern to be 3.2 hours at 25° C. The solid-state structure increases the half-life of the diiodoalkane from the solution-state value by a factor of five (compared to 1,2-diiodopentane).

Figure 3:
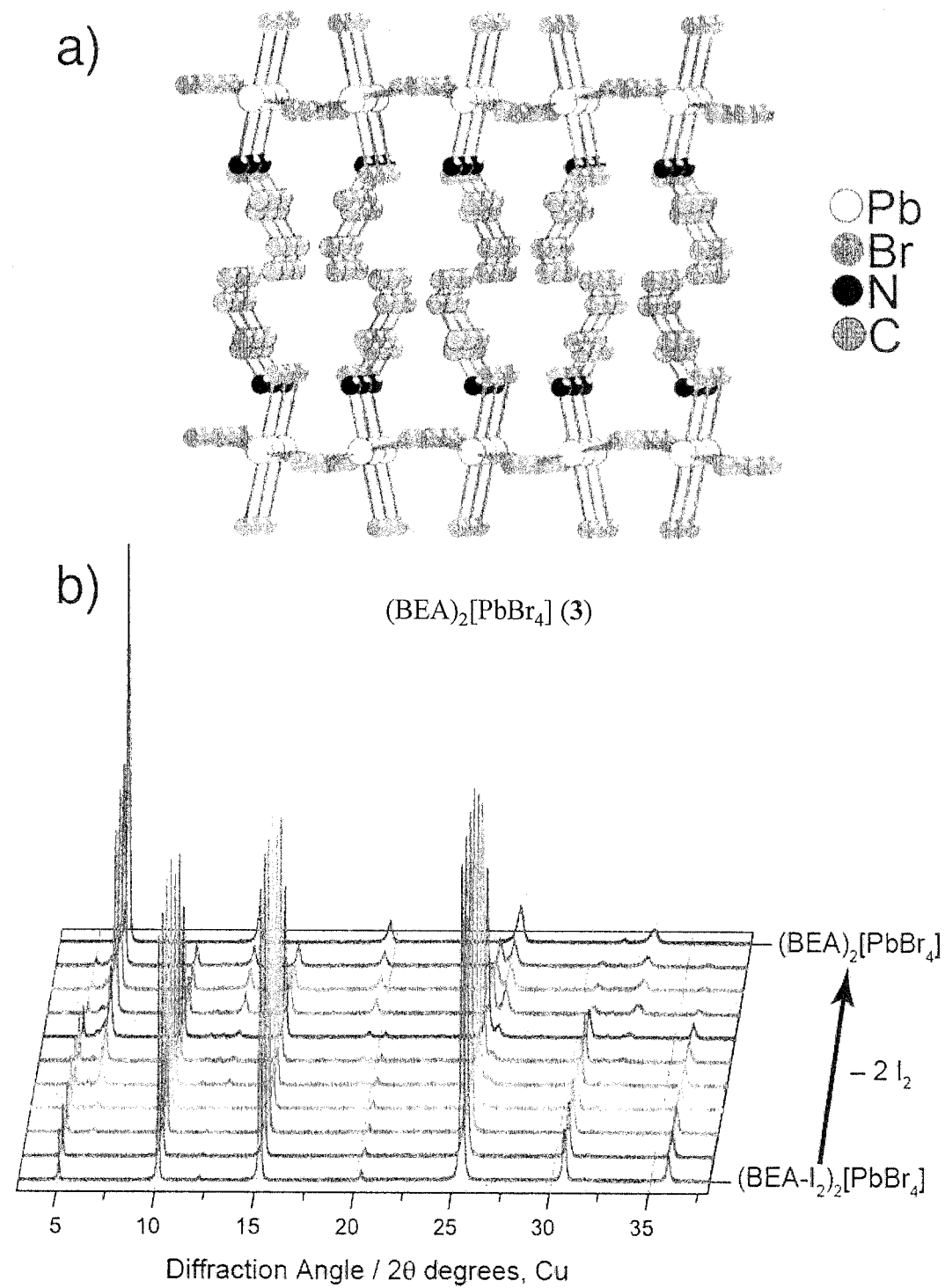
FIG. 3a) is a representation of the X-ray structure of $(BEA)_2[PbBr_4]$ (3), with Hydrogen atoms omitted for clarity.
FIG. 3b) provides powder x-ray diffraction patterns of an oriented film of $(BEA-I_2)_2[PbBr_4]$ (3-$2I_2$) that reverts back to the diffraction pattern of 3.

To probe the role of the crystal structure in stabilizing the diiodoalkane, a longer alkene can be examined. Solid (BEA)$_2$[PbBr$_4$] (3, FIG. 3a) also reacts with iodine, with a 29% increase in the c axis, to form the iodinated material: (BEA-I$_2$)$_2$[PbBr$_4$] (3-2I$_2$) (FIG. 3b). The subtle structural change in the organic molecules resulted in a significantly longer half-life of 72 hours for 3-2I$_2$—an increase of a factor of 22 from that of 2-2I$_2$ and of a factor of 112 from the solution-state value. The solution state half-lives of BEA-I$_2$ and PEA-I$_2$ are comparable; therefore, solid-state packing effects—particularly iodine-iodine interactions—are likely to stabilize the molecules. See, e.g., P. W. Robertson, et al., *J. Chem. Soc.* 1950, 2191-2194. Here, the longer molecule may accommodate a more efficient packing.

In contrast, (PEA)$_2$[CuCl$_4$] does not show a reaction even upon exposure to an iodine-saturated atmosphere for four days. Although not intending to be limited by theory, it is believed that this can be attributed to the substantially smaller Cu—Cl inorganic template compared to the Pb—Br template. Stabilization of diiodoalkanes that cannot be isolated in solution and the dependence of reactivity on the size of the inorganic template support a solid-gas reaction with iodine and is evidence against dissolution and recrystallization of the material.

As noted herein, reactivity of hybrid perovskites with iodine can, in some embodiments, be general to other halogens, as discussed in more detail below. However, the specific reactivity with and/or selectivity for different halogens can vary. For example, a hybrid perovskite that exhibits reversible capture of one halogen may exhibit irreversible capture of another halogen, as will be exemplified below.

For example, in certain embodiments, hybrid perovskites can exhibit irreversible bromine absorption. For example, certain hybrid perovskites can chemisorb bromine and form new C—Br bonds with retention of crystallinity. Similar to the reactivity described above with respect to I$_2$ gas, exposure of solid, crystalline (BEA)$_2$[PbBr$_4$] (3) to Br$_2$ gas can result in the formation of a new crystalline phase with an extended crystallographic c axis. Unlike iodine absorption by this alkene structure, however, bromine absorption by this hybrid perovskite is irreversible, owing to the greater stability of the dibromo-alkane compared to the diiodoalkane. Formation of BEA-Br$_2$ within the hybrid perovskite can be corroborated by the solid-state vibrational spectrum of the reaction product as well as by solution-state NMR and mass spectrometry of the digested material.

X-ray quality single crystals of the product (BEA-Br$_2$)$_2$[PbBr$_4$] (3-Br) can be obtained by slow evaporation of a concentrated solution of 3-Br in HBr. The crystal structure confirms that the transformation occurs as a topotactic expansion of the inorganic layers as Br$_2$ adds across the double bonds of the organic cations. As summarized below in Table 2, the crystallographic c axis expands by 3.23 Å (23.9%) and the unit-cell volume increases by 204 Å$^3$ (22.5%).

TABLE 2

Unit-cell parameter for (BEA)$_2$[PbBr$_4$] (3) and (BEA-Br$_2$)$_2$[PbBr$_4$] (3-Br)

| | 3* | 3-Br | Difference |
|---|---|---|---|
| a (Å) | 8.208(1) | 7.973(1) | −0.231 |
| b (Å) | 8.204(1) | 8.388(1) | 0.18 |
| c (Å) | 13.543(1) | 16.775(2) | 3.232 |
| alpha (°) | 96.22(1) | 95.61(1) | −0.61 |
| beta (°) | 90 | 95.89(1) | 5.89 |
| gamma (°) | 90 | 90.37(1) | 0.37 |
| Volume (Å$^3$) | 906.5(1) | 1110.5(1) | 204 |

*Unit cell reoriented for ease of comparison.

The C=C double bonds of BEA (1.306(1) and 1.303(1) Å) are elongated to form C—C single bonds in BEA-Br$_2$ (1.456(1) and 1.462 Å). The bromine atoms in 3-Br form one-dimensional channels that traverse the material with Br—Br contacts of 3.64 Å. While it can be difficult to obtain the crystal structure of (BEA-I$_2$)[PbBr$_4$] due to its instability to I$_2$ release, the close match between its PXRD pattern and the PXRD pattern predicted from the crystal structure of 3-Br confirms that very similar structures are formed in both cases.

Figure 4:
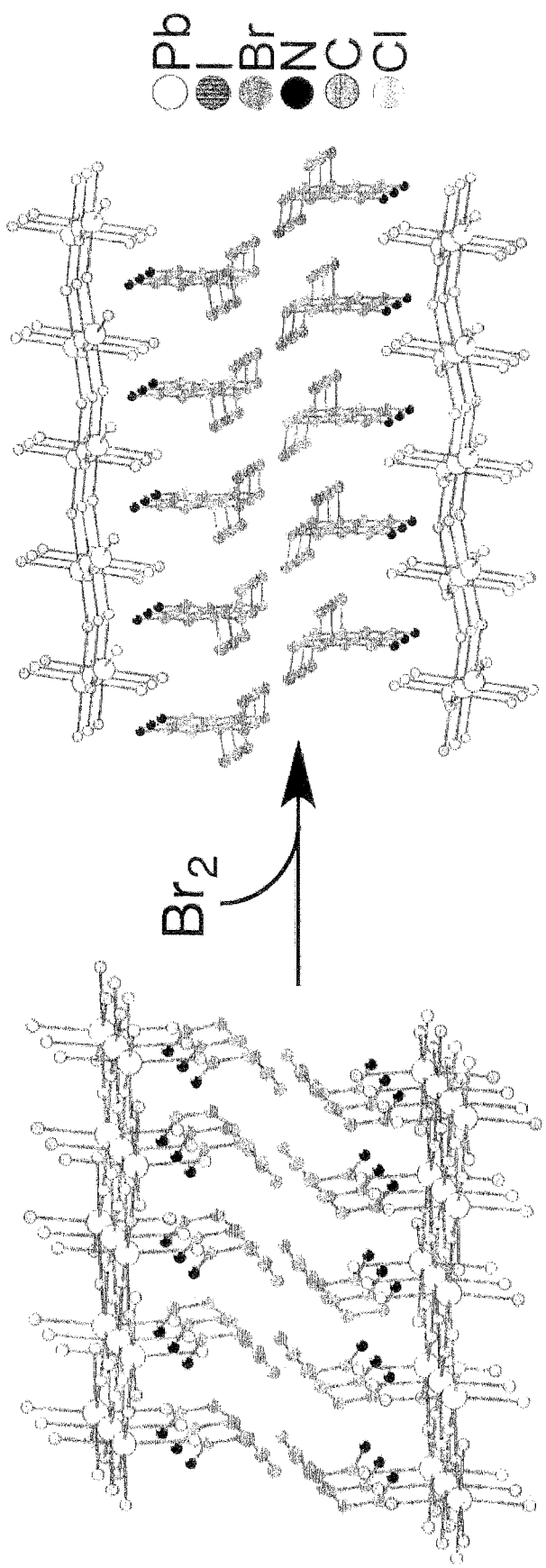
FIG. 4 is a representation of the crystal structures of $(BEA)_2[PbCl_4]$ and $(BEA-Br_2)_2[PbCl_4]$; wherein hydrogen atoms have been omitted for clarity.

In various embodiments, it is found that reactivity of 3 to Br$_2$ can be extended to hybrid perovskites containing different metals, halides, and alkenes. For example, both (BEA)$_2$[PbCl$_4$] and (PEA)$_2$[CuCl$_4$] react with Br$_2$ gas in the solid state to form (BEA-Br$_2$)$_2$[PbCl$_4$] and (PEA-Br$_2$)$_2$[CuCl$_4$], respectively. In both these transformations, the crystalline, layered-perovskite structure is retained in the product, as corroborated through single crystal x-ray diffraction. See, for example, FIG. 4.

In certain advantageous embodiments, the different capture characteristics associated with certain perovskites for different halogens (e.g., irreversible and reversible capture) can be utilized to selectively capture one molecule in the presence of another. For example, certain perovskites can be provided which exhibit reversible capture with respect to one small molecule and irreversible capture with respect to another small molecule. In some embodiments, this capability allows for the selective absorption of one type of small molecule over another (e.g., structurally and/or electronically similar) small molecule. Thus, hybrid perovskites can, in certain embodiments, separate mixtures of small molecules in gas streams (e.g., mixtures of iodine, bromine, and IBr).

Figure 5:
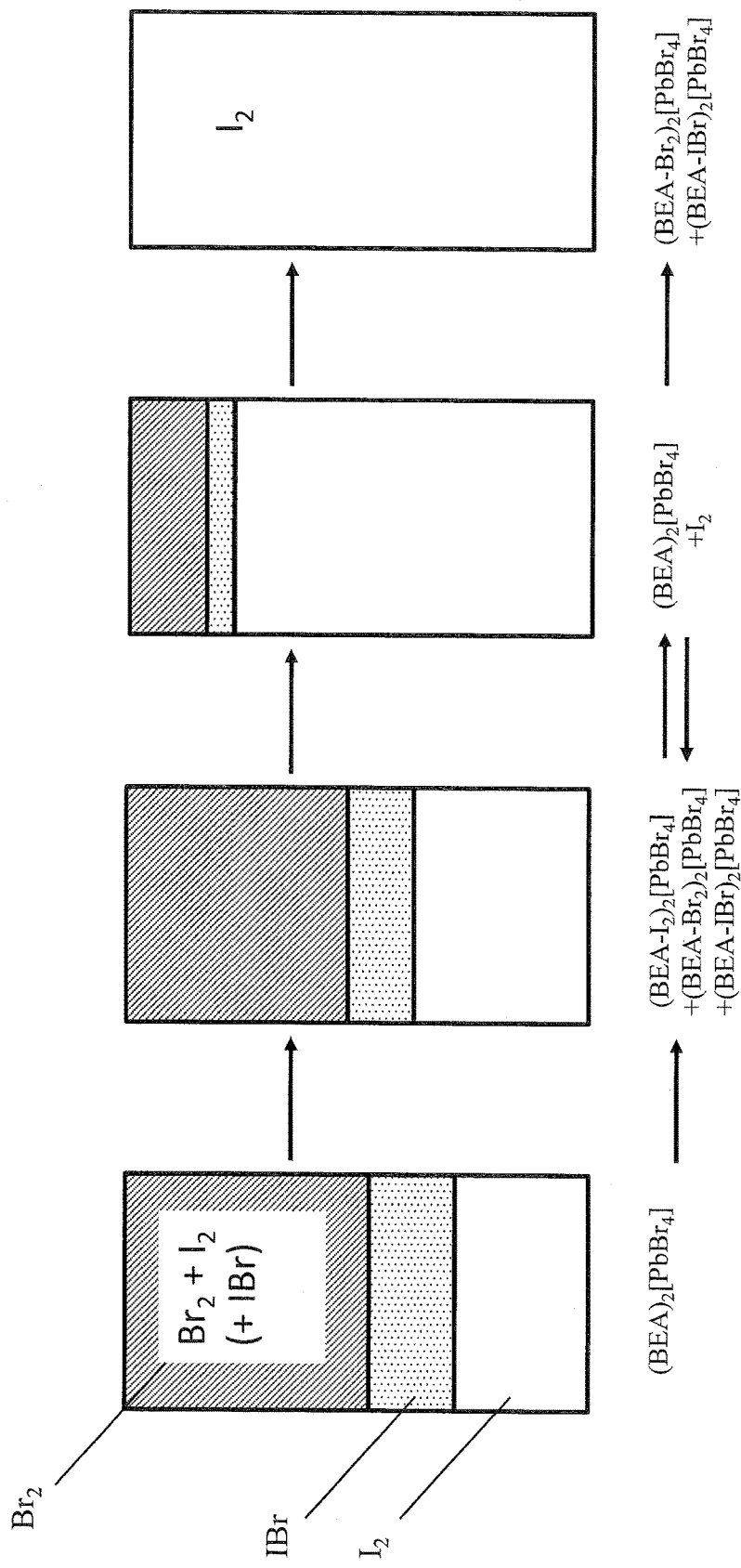
FIG. 5 is a schematic representation of iodine-bromine separation using $(BEA)_2[PbBr_4]$ as the sorbent.

For example, in one embodiment, hybrid perovskites are provided which exhibit irreversible capture of bromine (forming C—Br bonds in the organic layer) and reversible capture of iodine. For example, the reversible absorption of I$_2$ and the irreversible absorption of Br$_2$ by hybrid structure 3 (see, for example, FIG. 3a) can provide for iodine-bromine separation. Separation of I$_2$ and Br$_2$ has traditionally been challenging due to their similar size and reactivity. This separation is traditionally performed by halogen reduction followed by selective precipitation of their inorganic salts. This process can be labor and energy intensive, especially if the halogen, and not the halide, is the desired product. Gas-phase separation is further complicated because I$_2$ and Br$_2$ coexist in equilibrium with their reaction product, iodine monobromide (IBr). Use of hybrid perovskites for the separation of these molecules can be particularly useful, as such structures can, in some embodiments, selectively absorb bromine and iodine monobromide over iodine, thus effectively enabling gas separations. As illustrated in FIG. 5, for example, the irreversible bromine addition to hybrid structure 3 can shift the gas-phase equilibrium between $I_2$, $Br_2$ and towards $I_2$, thereby removing $Br_2$ and IBr from the gas-phase mixture (allowing $I_2$ in the gas stream to be effectively purified by the removal of these two species).

Certain hybrid perovskites described herein can exhibit the unique feature of halogen substitution at both the organic and inorganic layers as well as halide exchange between the organic and inorganic layers. For example, exposure of lead bromide-based hybrid perovskites to chlorine results in halide exchange, with the inorganic layers converting into lead-chloride and bromine trapped in the organic layers. This multistep process can happen with retention of crystalline perovskite layers, as discussed in more detail below. Halide conversion in the inorganic components can also allow the transformation of the three-dimensional perovskite from $(CH_3NH_3)[PbI_3]$ to $(CH_3NH_3)[PbBr_3]$ to $(CH_3NH_3)[PbCl_3]$ using halogen gas.

Figure 6:
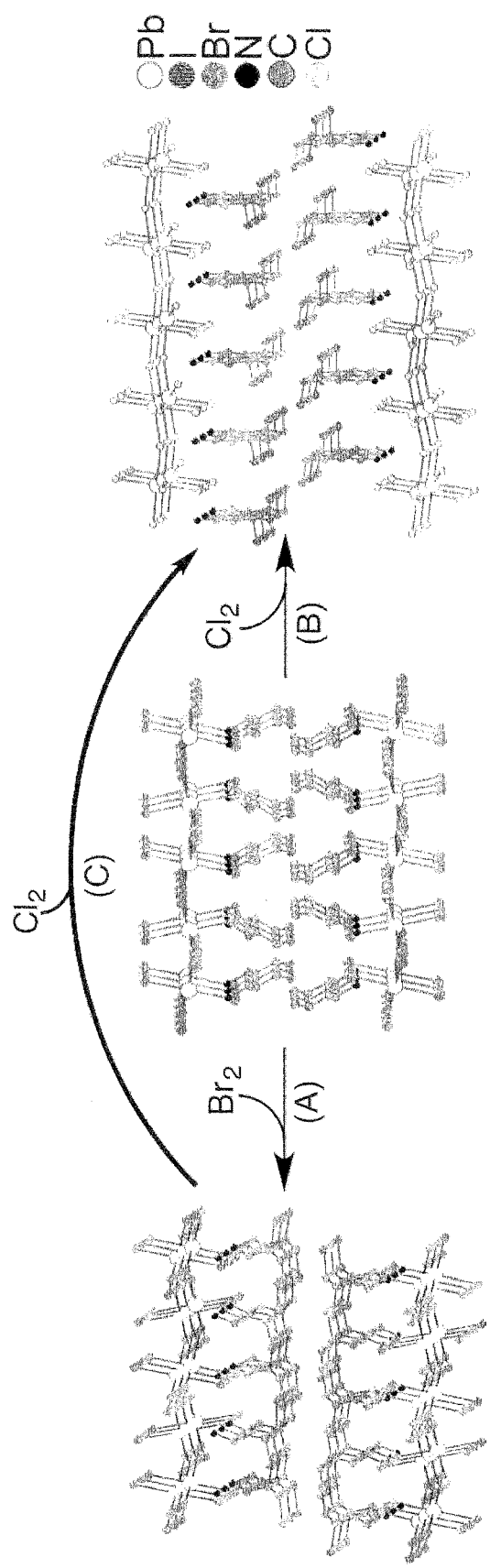
FIG. 6 is schematic representation of the reactivity of $(BEA)_2[PbBr_4]$ towards bromine and chlorine (from left to right: crystal structures of (BEA-Br$_2$)$_2$[PbBr$_4$], (BEA)$_2$[PbBr$_4$] and (BEA-Br$_2$)$_2$[PbCl$_4$]), wherein hydrogen atoms have been omitted for clarity.

In various embodiments, it was found that exposure of $(BEA)_2[PbBr_4]$ to $Cl_2$ gas can result in the formation of a new crystalline phase. However, analysis of the digested product by mass spectrometry revealed that the reaction product was $BEA-Br_2$ and not $BEA-Cl_2$. The PXRD pattern of the reaction product matches that of the lead-chloride perovskite $(BEA-Br_2)_2[PbCl_4]$ (4-Br) (FIG. 6B), indicating that the $Cl_2$ was incorporated in the inorganic sheets instead of the organic layers. Remarkably, this transformation also occurs with retention of crystallinity. Without intending to be limited by theory, it is hypothesized that the $Br^-$ ions in the inorganic sheets are oxidized by $Cl_2$ to form $Br_2$ and $2Cl^-$, and $Br_2$ adds across the double bonds of the organic molecules to facilitate halogen exchange between the organic and inorganic layers.

Several control reactions can be performed to test this proposal. First, $(BEA-Cl_2)_2[PbBr_4]$ (3-Cl) can be independently crystallized to confirm that it can be isolated, and structural instability of 3-Cl was not the reason that it is not formed through the reaction of 1 and $Cl_2$. Next, layered perovskites with saturated hydrocarbons in the organic layers can be exposed to $Cl_2$, to assess if terminal alkene groups are necessary for this transformation. Exposure of $(BEA-Br_2)_2[PbBr_4]$ to chlorine gas resulted in its conversion to $(BEA-Br_2)_2[PbCl_4]$ (FIG. 6C) indicating that oxidation of the inorganic and organic layers are decoupled. The difference in reactivity of BEA with $Br_2$ and $Cl_2$ can be explained in terms of kinetics, and is consistent with reported experimental rates of chlorination and bromination of alkenes in solution and computational studies of the relative stabilities of the halonium ions. The conversion of Pb—Br sheets to Pb—Cl sheets by $Cl_2$ can be understood by the oxidation potentials of $Cl_2$ and $Br_2$ (1.36 and 1.04 V vs SHE for $Cl_2$ and $Br_2$, respectively), which show that $Cl_2$ can oxidize $Br^-$ to form $Br_2$.

This reactivity can be general to other halide perovskites. For example, $(MA)[PbI_3]$ and $(MA)[PbBr_3]$ (MA=methyl ammonium) can be exposed to bromine and chlorine, respectively. Both experiments resulted in complete oxidation of the material and formation of the lighter-halide perovskite in a highly crystalline form. Similarly, (MA)[PbI_3] can be transformed directly into $(MA)[PbCl_3]$ through exposure to $Cl_2$ gas.

Accordingly, it is demonstrated herein that hybrid perovskites functionalized with unsaturated linkers can serve as absorbents for halogens. Unlike traditional materials, the selectivity is modulated by chemical reactivity, which allows for fine-tuning. It is further illustrated that several halogens are able to move in between the layers of the hybrids, regardless of the lack of porosity in the hybrid perovskite structure.

The hybrid perovskites described herein can be used in a wide range of applications. Clearly, these materials show great promise as sorbent materials for one or more halogens. Advantageously, as the hybrid perovskites function by chemisorption rather than physisorption, they can be used in applications where selectivity is desirable. For example, for the sequestration of one or more halogens from mixed gas streams, the capacity of hybrid perovskites for sequestering the one or more halogens advantageously is not largely impacted by the presence of other materials in the gas stream (e.g., water vapor and common impurities, including, but not limited to, NOx, and the like).

In specific applications, the hybrid perovskite structures can be used for the capture of gas-phase radioactive iodine in spent nuclear waste streams for long-term sequestration as a dense solid. The retained inorganic/organic layered structure of the resulting materials can be particularly beneficial, as it may serve to attenuate the beta, gamma, and x-ray radiation emitted from radioactive iodine isotopes. The structures can also be used for time-release capture of radioactive iodine isotopes for inexpensive regeneration of the capture material. The materials can also be used to capture iodine until all but the longest-lived radioactive isotope ($^{129}I$) have decayed, at which time the material could be transported to a nuclear transmutation facility for conversion of $^{129}I$ to a stable isotope. Hybrid perovskites can also be used for delivery of Iodine ($I_2$) for disinfecting air streams and surfaces, for example. Mixtures of iodine ($I_2$) and iodide ($I^-$) salts in aqueous/alcoholic solutions are used for medical applications (e.g., disinfecting wounds and surfaces). Solid iodine-release materials can be easier to handle compared to solutions and can also be better suited for applications using membranes, such as air filters with disinfecting properties. The perovskite structures can also have applications in wound dressings with sustained antimicrobial activity. Additionally, certain hybrid perovskite structures described herein can also be useful for separating small amounts of bromine from iodine vapor to obtain high purity iodine. The perovskite structures can have many other uses not listed herein.

EXAMPLES

The following non-limiting examples can be useful to further illustrate the inventions described herein.

In the following examples, aqueous solutions are prepared using deionized water. Organic solvents are of reagent grade or higher purity and not dried prior to use. Solid but-3-yn-1-ammonium chloride is prepared according to literature procedure. See, e.g., Hess, W.; Burton, J. W.; *Chem. Eur. J.* 2010, 16, 12303-12306, which is incorporated herein by reference. All other reagents are purchased from commercial vendors and used without further purification. Abbreviations used: BYA (but-3-yn-l-ammonium), BEA (but-3-en-1-ammonium), PEA (prop-2-en-1-ammonium), and BYA-$I_2$ ((E)-3,4-diiodobut-3-en-1-ammonium).

In general, for solid-state iodination reactions, perovskite samples (approx. 0.1 mmol for powders and 0.01 mmol for thin films) supported on glass slides are placed in a darkened glass jar containing 1.5-2.0 g of iodine crystals, and the jar was closed with a PTFE-lined cap. The slides are placed vertically to avoid contact between solids. After reaction with iodine the alkyne-perovskite samples ($(BYA-I_2)_2[PbBr_4]$) are held at reduced pressure for 30 minutes to remove surface-adsorbed iodine before analysis by powder x-ray diffraction, NMR or mass spectrometry. The alkene-perovskite samples are immediately mounted on the diffractometer without further purification due to the reversible nature of the chemisorption. Crystalline iodine is not observed in any of the powder patterns.

With regard to powder x-ray diffraction (Powder XRD), experiments are conducted on a Panalytical X'Pert Pro diffractometer with a Bragg-Brentano geometry and PPC detector equipped with a curved graphite monochromator. Experimental conditions are given in Table S1 below. The simulated powder patterns are calculated using the crystallographic information files (CIF) from single-crystal x-ray experiments.

TABLE S1

Experimental details for powder x-ray diffraction experiments

| | |
|---|---|
| Step size (° 2Theta) | 0.02 |
| Divergence slit type | Automatic |
| Anode material | Cu |
| $K\alpha_1$ (Å) | 1.54060 |
| $K\alpha_2$ (Å) | 1.54443 |
| $K\alpha_2/K\alpha_1$ ratio | 0.50000 |

With regard to preparation of oriented films, oriented films of the hybrid perovskites are deposited on glass slides by drop-casting 25-50 μL of a 0.25 M solution of the perovskite in a 1:1 mixture of methanol and the corresponding concentrated HX acid (X=Cl or Br). The solution is allowed to evaporate at room temperature and the film is washed twice with diethyl ether to remove residual acid.

With regard to other physical measurements, infrared spectra are collected on a Thermo Nicolet 6700 spectrometer with a Smart Orbit attenuated total reflectance accessory. NMR spectra are recorded on a Varian Inova-500 instrument and peaks are referenced to residual solvent peaks. Solids are ball-milled using a Spex dual mixer/mill in a 2.5 mL stainless-steel vial equipped with a 6.35 mm stainless-steel ball. 50-mg samples of the solids are milled for 2 hours at 1060 cycles/min prior to iodination reactions. Carbon, hydrogen, and nitrogen analyses are obtained from MHW Laboratories (Phoenix, Ariz.). Mass spectrometry in methanol is performed in a Waters 2795 HPLC system ZQ single quadrupole MS with an electrospray ionization source using direct injection. Thermogravimetric analyses are performed in a Netzsch F1 Libra instrument using alumina pans and heating rates of 5° C./min. Typical sample sizes are 2-8 mg.

With regard to reactions with $NO_x$, a known volume of NO gas (98.5%) is transferred to an evacuated chamber containing $(BYA)_2[PbBr_4]$ and iodine. The chamber is then filled with air until a pressure of 1 atm is reached. After 6 hours, the samples are removed from the chamber and held at reduced pressure for one hour. The samples are first analyzed by powder XRD. Then the solids are suspended in $D_2O$, agitated vigorously for 10 minutes, and filtered prior to analysis by $^1$H-NMR.

With regard to humidity studies, polycrystalline $(BYA)_2[PbBr_4]$ or $(BEA)_2[PbBr_4]$ (approx. 30 mg) deposited on glass slides is placed inside a closed vessel containing a saturated solution of $MgCl_2$, LiCl, or NaCl. The perovskites are not in direct contact with the solution. The temperature is controlled using a bath made of Lab Armor® beads and the relative humidity estimated according to reported values. See, e.g., Brien, F. E. M. O. J. Sci. Instrum. 1948, 25, 73-76, which is incorporated herein by reference. The perovskites are allowed to stand in the chamber for 24 hours and then analyzed by powder x-ray diffraction. Solid (BEA)Cl and (BYA)Cl deliquesce at relative humidities as low as 11% and hence, was not analyzed by x-ray diffraction after exposure to humidity.

With regard to crystal structure determination, crystals are coated with Paratone-N oil, attached to a Kapton loop, and transferred to a Bruker D8 Venture diffractometer equipped with a Photon 100 CMOS detector. Frames are collected using ω and ψ, scans and the unit-cell parameters are refined against all data. The crystals did not show significant decay during data collection. Data are integrated and corrected for Lorentz and polarization effects using SAINT 8.27b, and are corrected for absorption effects using SADABS V2012. See, e.g., SAINT and SADABS; Bruker AXS Inc.: Madison, Wis., (2007), which is incorporated herein by reference. Space-group assignments are based upon systematic absences, E-statistics, agreement factors for equivalent reflections, and successful refinement of the structure. The structures are solved by direct methods and expanded through successive difference Fourier maps using SHELXS-97. They are refined against all data using the SHELXTL-2013 software package. See, e.g., Sheldrick, G. M. SHELXL-97, Program for crystal structure refinement; Göttingen, 1997; and G. M. Sheldrick, G. M. Acta Cryst. Sect. A 2008, 64, 112-122, which are incorporated herein by reference. Hydrogen atoms are inserted at idealized positions and refined using a riding model with an isotropic thermal parameter 1.2 times that of the attached carbon atom or 1.5 times that of the attached nitrogen. Thermal parameters for all non-hydrogen atoms are refined anisotropically. The disorder in the BEA group is modeled using similarity restraints on 1,2- and 1,3-distances as well as rigid-bond restraints for anisotropic displacement parameters. The occupancies of disordered groups are allowed to refine freely, while constraining the sum of the occupancies to unity. Similar rigid-bond restraints are also applied to atoms not involved in the disorder to stabilize the refinement. Details regarding the data quality and a summary of the residual values of the refinements are listed in Tables S3 and S4 below.

With regard to attenuation of radiation by perovskites, the radiation-attenuation effect of the perovskites is evaluated for the two main emissions of $^{129}$I: beta (150 keV) and gamma (38 keV) radiation. See, e.g., Strominger, D.; Hollander, J.; Seaborg, G. Reviews of Modern Physics; 1958, 30, 585-904, which is incorporated herein by reference. The linear absorption coefficient (μ) for the materials is calculated using NIST's attenuation calculator. See, http://physics.nist.gov/PhysRefData/FFast/html/form.html accessed on Jul. 31, 2013. CCDC 955776-8 contain the supplementary crystallographic data for this paper. These data can be obtained free of charge from the Cambridge Crystallographic Data Centre via www.ccdc.cam.ac.uk/data_request/cif. The formula and density values are obtained from x-ray experiments. The value of μ is the factor by which the radiation intensity is weakened when it travels a path x through the material such that $I=I_o e^{-\mu x}$, where $I_o$ and I are the intensities of the incident and transmitted beams, respectively. See, e.g., Massa, W. Crystal Structure Determination; 2nd ed.; Springer: New York, 2004, pp. 67-92, which is herein incorporated by reference. The results of these calculations are summarized in Table S2.

TABLE S2

Calculated radiation attenuation coefficients

|  | Linear absorption coefficient ($\mu$) at 38 keV (cm$^{-1}$) | Linear absorption coefficient ($\mu$) at 150 keV (cm$^{-1}$) |
| --- | --- | --- |
| (BYA)$_2$[PbBr$_4$] | 32.3 | 2.1 |
| (BYA-I2)$_2$[PbBr$_4$] | 72.4 | 2.6 |
| (BEA)$_2$[PbBr$_4$] | 29.9 | 1.9 |
| Pb$^0$ | 236.2 | 22.8 |
| C$_4$H$_9$NH$_2$·H$_2$O* | 0.23 | 0.14 |

*The reported crystal structure was used for this calculation. See, e.g., I. Halasz, *Cryst. Growth Des.* 2010, 10, 2817-2823, which is incorporated herein by reference.

Example 1

(BYA)$_2$[PbBr$_4$] is prepared. A 3-mL solution of (BYA)Cl (0.200 g, 1.89 mmol) in methanol is added dropwise to a stirred cold (−10° C.) 3-mL solution of PbBr$_2$ (0.340 g, 0.93 mmol) in 9 M HBr. After 15 minutes, the resulting colorless precipitate is filtered while cold through a glass frit and washed with cold (−10° C.) diethyl ether (4×5 mL). The colorless crystalline solid is held at reduced pressure for one hour to afford 0.536 g (86.4% yield) of product. Crystals suitable for single-crystal diffraction studies are obtained by slow evaporation of a concentrated solution of (BYA)$_2$[PbBr$_4$] in a 1:1 methanol: HBr (9 M) mixture. IR(neat): 3274(m), 2998(s), 2911(m), 1574(m). 1476(s), 1463(s), 1425(m), 1323(m), 1130(m), 953(w), 935(s), 915(s), 768(w), 652(s), 494(s) cm$^{-1}$. Anal. Calcd. for C$_8$H$_{16}$N$_2$PbBr$_4$: C, 14.40; H, 2.42; N, 4.20. Found: C, 14.60; H, 2.61; N, 4.23.

The reaction product of (BYA)$_2$[PbBr$_4$] and iodine is characterized as follows: IR(neat): 3274(s), 3419(m), 3062(s), 3022(s), 2923(m), 1610(w), 1562(m), 1467(s), 1456(s), 1427(m), 1383(m), 1311(w), 1268(w), 1206(m), 1126(m), 1108(s), 1017(m), 937(w), 922(m), 771(s), 663(m), 570(m), 521(m) cm$^{-1}$. Crystals suitable for single-crystal diffraction studies are obtained by slow evaporation of a concentrated solution of (BYA-I$_2$)$_2$[PbBr$_4$] in a 1:1 methanol: HBr (9 M) mixture. $^1$H NMR (500 MHz, D$_2$O, 25° C.): 7.28 (s, 1H, C═C—H), 3.20 (t, $^3J_{H-H}$=6.9 Hz, 2H, CH$_2$N), 2.93 (t, $^3J_{H-H}$=6.9 Hz, 2H, CH$_2$C═C).

Table S3 below shows crystallographic data for (BYA)$_2$[PbBr$_4$] and (BYA-I$_2$)$_2$[PbBr$_4$]:

TABLE S3

Crystallographic data$^a$ for (BYA)$_2$[PbBr$_4$] and (BYA-I$_2$)$_2$[PbBr$_4$]

|  | (BYA)$_2$[PbBr$_4$] | (BYA-I$_2$)$_2$[PbBr$_4$] |
| --- | --- | --- |
| Empirical formula | C$_8$H$_{16}$Br$_4$N$_2$Pb | C$_8$H$_{16}$Br$_4$I$_4$N$_2$Pb |
| Formula weight, g mol$^{-1}$ | 667.03 | 1178.69 |
| Temperature, K | 100(2) | 100(2) |
| Crystal system | Monoclinic | Triclinic |
| Space group | P2$_1$/c | P-1 |
| a, Å | 12.8078(6) | 7.9821(5) |
| b, Å | 7.8189(4) | 8.1423(5) |
| c, Å | 8.3859(3) | 17.630(1) |
| α,° | 90 | 88.425(2) |
| β,° | 93.504(2) | 85.355(2) |
| γ,° | 90 | 89.868(2) |
| Volume, Å$^3$ | 838.22(7) | 1141.6(1) |
| Z | 2 | 2 |
| Density (calculated), g cm$^{-3}$ | 2.643 | 3.417 |
| Absorption coefficient, mm$^{-1}$ | 19.563 | 19.790 |
| F(000) | 876 | 1024 |
| Crystal size, mm$^3$ | 0.15 × 0.10 × 0.05 | 0.05 × 0.05 × 0.03 |
| Theta range, ° | 3.05 to 28.69 | 2.50 to 25.68 |
| Index ranges | −17 ≤ h ≤ 17 | −9 ≤ h ≤ 9 |
|  | −9 ≤ k ≤ 10 | −9 ≤ k ≤ 9 |
|  | −11 ≤ l ≤ 9 | −21 ≤ l ≤ 21 |
| Reflections collected/unique | 20190/2172 | 20523/4098 |
| Completeness to theta max, % | 100 | 99.6 |
| Max. and min. transmission | 0.32 and 0.041 | 0.59 and 0.29 |
| Data/restraints/parameters | 2172/0/71 | 4098/0/177 |
| Goodness-of-fit on F$^2$ | 1.101 | 0.81 |
| Final R indices [I > 2sigma(I)]$^b$ | R$_1$ = 0.0195 | R$_1$ = 0.0404 |
|  | wR$_2$ = 0.0473 | wR$_2$ = 0.120 |
| R indices (all data)$^b$ | R$_1$ = 0.023 | R$_1$ = 0.046 |
|  | wR$_2$ = 0.049 | wR$_2$ = 0.125 |
| Largest diff. peak and hole, e Å$^{-3}$ | 1.52 and −0.94 | 3.53 and −2.30 |

$^a$Obtained with monochromated Mo Kα ($\lambda$ = 0.71073 Å) radiation
$^b$R$_1$ = Σ||F$_o$| − |F$_c$||/Σ|F$_o$|, wR$_2$ = [Σw(F$_o^2$ − F$_c^2$)$^2$/Σ(F$_o^2$)$^2$]$^{1/2}$

Example 2

(BEA)$_2$[PbBr$_4$] is prepared. A 3-mL solution of (BEA)Cl (0.200 g, 1.86 mmol) in methanol is added dropwise to a stirred cold (−10° C.) 3-mL solution of PbBr$_2$ (0.330 g, 0.90 mmol) in 9 M HBr. After 15 minutes, the resulting colorless precipitate is filtered while cold through a glass frit and washed with cold (−10° C.) diethyl ether (4×5 mL). The colorless crystalline solid is held at reduced pressure for one hour to afford 0.425 g (70.4% yield) of product. Crystals suitable for single-crystal diffraction are obtained by slow diffusion of acetone into a concentrated solution of the product in 9 M HBr. IR(neat): 3007(s), 2910(s), 1644(m), 1575(w), 1465(s), 1386(w), 1125(m), 995(m), 923(s), 773(s), 629(w) cm$^{-1}$. Anal. Calcd. for C$_8$H$_{20}$N$_2$PbBr$_4$: C, 14.32; H, 3.00; N, 4.17. Found: C, 14.12; H, 3.22; N, 4.11.

Table S4 below shows crystallographic data for (BEA)$_2$[PbBr$_4$]:

TABLE S4

Crystallographic data$^a$ for (BEA)$_2$[PbBr$_4$]

|  | (BEA)$_2$[PbBr$_4$] |
| --- | --- |
| Empirical formula | C$_2$H$_{20}$Br$_4$N$_2$Pb |
| Formula weight, g mol$^{-1}$ | 671.09 |
| Temperature, K | 296(2) |
| Crystal system | Monoclinic |
| Space group | P2$_1$/c |
| a, Å | 8.208(1) |
| b, Å | 8.204(1) |
| c, Å | 13.543(1) |
| α,° | 90 |
| β,° | 96.22(1) |
| γ,° | 90 |
| Volume, Å$^3$ | 906.5(2) |
| Z | 2 |
| Density (calculated), g cm$^{-3}$ | 2.462 |
| Absorption coefficient, mm$^{-1}$ | 18.126 |
| F(000) | 608 |
| Crystal size, mm$^3$ | 0.30 × 0.10 × 0.08 |
| Theta range, ° | 2.91 to 25.68 |
| Index ranges | −13 ≤ h ≤ 16 |
|  | −10 ≤ k ≤ 9 |
|  | −10 ≤ l ≤ 9 |
| Reflections collected/unique | 10961/1708 |
| Completeness to theta max, % | 100 |
| Max. and min. transmission | 0.3430 and 0.0740 |
| Data/restraints/parameters | 1708/154/118 |
| Goodness-of-fit on F$^2$ | 1.048 |

TABLE S4-continued

Crystallographic data[a] for (BEA)$_2$[PbBr$_4$]

|  | (BEA)$_2$[PbBr$_4$] |
|---|---|
| Final R indices [I > 2sigma(I)][b] | R$_1$ = 0.0349 |
|  | wR$_2$ = 0.0868 |
| R indices (all data)[b] | R$_1$ = 0.0463 |
|  | wR$_2$ = 0.0930 |
| Largest diff. peak and hole, e Å$^{-3}$ | 1.610 and −0.643 |

[a]Obtained with monochromated Mo Kα (λ = 0.71073 Å) radiation
[b]R$_1$ = Σ||F$_o$| − |F$_c$||/Σ|F$_o$|, wR$_2$ = [Σw(F$_o^2$ − F$_c^2$)$^2$/Σ(F$_o^2$)$^2$]$^{1/2}$

Example 3

(PEA)$_2$[PbBr$_4$] is prepared. A 2-mL methanol solution of prop-2-en-1-amine (0.200 g, 3.50 mmol) is added dropwise to a stirred cold (−10° C.) 2-mL solution of PbBr$_2$ (0.640 g, 0.90 mmol) in 9 M HBr. After 15 minutes, the resulting colorless precipitate is filtered while cold through a glass frit and washed with cold (−10° C.) diethyl ether (4×5 mL). The colorless crystalline solid is held at reduced pressure for one hour to afford 1.01 g (90.3% yield) of product. IR(neat): 3042(m), 3022(s), 2923(m), 1646(w), 1574(s), 1478(s), 1426(m), 1388(w), 1365(m), 1310(w), 1193(w), 1130(w), 1099(m), 1011(w), 978(m), 949(s), 922(m), 867(m), 645(m), 552(w) cm$^{-1}$. Anal. Calcd. for C$_6$H$_{16}$N$_2$PbBr$_4$: C, 11.21; H, 2.51; N, 4.36. Found: C, 11.48; H, 2.26; N, 4.11.

Example 4

(PEA)$_2$[CuCl$_4$] is prepared. Concentrated HCl (3 mL, 12 M, 3.60 mmol) is added dropwise to a stirred cold (0° C.) 2-mL solution of prop-2-en-1-amine (0.200 g, 2.9 mmol). The solution is allowed to warm and copper (II) chloride (0.200 g, 1.49 mmol) was added. The resulting suspension was stirred for 24 hours after which a yellow-green precipitate forms. The solid is filtered through a glass frit and dried under reduced pressure to afford 0.27 g (57.9% yield) of product as a yellow microcrystalline solid. IR(neat): 3087(s), 2941(m), 1648(w), 1573(m), 1480(s), 1367(w), 1315(w), 1193(w), 1102(m), 987(s), 931(s), 869(m), 632(m), and 444(w) cm$^{-1}$.

Example 5

Irreversible chemisorption can be achieved with embodiments of the hybrid structures described herein. The crystal structure of (BYA)$_2$[PbBr$_4$] (BYA=but-3-yn-1-ammonium) (See, e.g., FIGS. 1 and 2a) confirms the formation of the hybrid perovskite. The alkyne groups show a typical C≡C bond distance of 1.18(1) Å and an almost linear C—C≡C angle of 176.5(5°). Solid (BYA)$_2$[PbBr$_4$] is exposed to iodine vapor in a dark chamber and the reaction is monitored using powder x-ray diffraction. Upon exposure to iodine, the growth of a new phase with an elongated crystallographic c axis (a measure of the distance between the inorganic sheets) (see, e.g., FIG. 2c) is visible. The solid-state vibrational spectrum of the product also shows the disappearance of the alkyne C—H stretch at 3274 cm$^{-1}$ evident for (BYA)$_2$[PbBr$_4$]. The material is then digested to isolate the organic compounds. Analysis by mass spectrometry and NMR spectroscopy ($^1$H and 1D NOE) shows that the BYA molecules have been oxidized to form (E)-3,4-diiodubut-3-en-1-ammonium (BYA-I$_2$) molecules. Employment of rigorously anhydrous conditions did not affect this reaction and finely-ground samples reacted faster than oriented films, indicating that higher surface area increased the reaction rate. A ball-milled sample showed 94% conversion to the iodinated product upon exposure to an iodine-saturated atmosphere for four hours. It is noted that this apparent reaction rate depends on particle size and gas-solid mixing efficiency. Upon iodination of single crystals of (BYA)$_2$[PbBr$_4$], unit cell parameters from crystals are repeatedly obtained, which matched those determined from the powder diffraction pattern of the polycrystalline product. However, high-quality diffraction data from the single-crystal studies is difficult to obtain, likely due to the strain resulting from the massive unit-cell expansion. Therefore, the product is recrystallized such that well-formed single crystals for structure solution are obtained. The simulated powder pattern from the single-crystal structure matches the powder diffraction pattern obtained from the product of the reaction with iodine vapor, confirming that the same material is formed in both cases. The x-ray structure of (BYA-I$_2$)$_2$[PbBr$_4$] (FIG. 2b) confirms that the layered perovskite structure is maintained in the product, which displays an extended two-dimensional network of iodine-iodine interactions (I-I distances of 3.659(1) and 4.05(1)Å) that runs parallel to the inorganic sheets.

Example 6

Reversible chemisorption can be achieved with embodiments of the hybrid structures described herein. The alkene perovskite (BEA)$_2$[PbBr$_4$] crystallizes in the same space group as (BYA)$_2$[PbBr$_4$] (P2$_1$/c), but with less interdigitation in the organic bilayer (FIG. 3a). Exposure of the solid alkene perovskites (PEA)$_2$[PbBr$_4$] to iodine vapor leads to an elongation of the crystallographic c axes which can be clearly seen in powder x-ray patterns of oriented films which only show peaks corresponding to the {001} reflections (FIG. 3b). Iodine addition across the C—C double bonds is further corroborated by vibrational spectroscopy which reveals a decrease in the intensity of the C—C double bond stretching frequency at ca. 1640 cm$^{-1}$ in the solid-state spectra. Iodine evolution from these materials can be monitored through powder x-ray diffraction which, over time, shows a decrease in intensity of the reflections corresponding to the iodinated perovskite and the concomitant increase in intensity of reflections due to the parent alkene perovskite.

Example 7

Bromine absorption capabilities of embodiments of the hybrid structures can be evaluated in iodine-bromine mixtures. For example, two distinct scenarios can be evaluated: first with a 1:1 and later with 2:1 iodine-bromine ratio. In these two cases, 87 and 86% of the total bromine was recovered as (BEA-Br$_2$)$_2$[PbBr$_4$], which in turns results in a final bromine concentration of less than 20 ppm in the gas phase. These results illustrate that difficult separations can be done by means of chemical selectivity in solid nonporous sorbents.

Many modifications and other embodiments of the invention will come to mind to one skilled in the art to which this invention pertains having the benefit of the teachings presented in the foregoing description; and it will be apparent to those skilled in the art that variations and modifications of the present invention can be made without departing from the scope or spirit of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A sorbent having a layered, non-porous perovskite structure, comprising parallel, alternating layers of:
   an organic layer, comprising an ordered array of organic moieties capable of reacting with a gaseous halogen, wherein the organic moieties comprise terminal alkyne groups or terminal alkene groups; and
   an inorganic layer, comprising a metal-halide sheet,
   wherein each organic layer is sandwiched between inorganic layers.

2. The sorbent of claim 1, wherein the organic moieties comprise ammonium ions.

3. The sorbent of claim 1, wherein the organic moieties comprise alkyne groups.

4. The sorbent of claim 3, wherein the organic moieties comprise but-3-yn-1-ammonium (BYA) ions.

5. The sorbent of claim 3, wherein the alkyne groups are capable of reacting with the gaseous halogen by the formation of covalent bonds.

6. The sorbent of claim 5, wherein the alkyne groups are capable of reacting with gaseous $I_2$ by the formation of covalent C—I bonds.

7. The sorbent of claim 1, wherein the organic moieties comprise alkene groups.

8. The sorbent of claim 7, wherein the organic moieties are selected from the group consisting of but-3-en-1-ammonium (BEA) ions, prop-2-en-1-ammonium (PEA) ions, and combinations thereof.

9. The sorbent of claim 7, wherein the alkene groups are capable of reacting with the gaseous halogen by the formation of dihaloalkanes.

10. The sorbent of claim 9, wherein the alkene groups are capable of reacting with gaseous $I_2$ by the formation of diiodoalkanes.

11. The sorbent of claim 9, wherein the alkene groups are capable of reacting with gaseous $Br_2$ by the formation of dibromoalkanes.

12. The sorbent of claim 1, wherein the metal is selected from the group consisting of Pb, Cu, Mn, Co, Ni, Sn, Fe, and Ge, and wherein the halide is selected from the group consisting of Cl, Br, and I.

13. The sorbent of claim 1, wherein the metal-halide sheet comprises $[PbBr_4]^{2-}$ units.

14. The sorbent of claim 1, wherein the sorbent is in the form of a powder or a thin film.

15. The sorbent of claim 1, wherein the sorbent is stable at temperatures up to about 240° C.

16. The sorbent of claim 1, wherein the sorbent is stable at relative humidity levels from 0 to about 75% at 50° C. over at least a 24-hour period of time.

17. The sorbent of claim 1, wherein the sorbent comprises $(BYA)_2[PbBr_4]$, $(BEA)_2[PbBr_4]$, $(BEA)_2[PbCl_4]$, $(PEA)_2[PbBr_4]$, or $(PEA)_2[CuCl_4]$.

18. A method for capturing one or more halogens from a gas stream, comprising contacting the gas stream with the sorbent of claim 1.

19. A method for irreversibly capturing gaseous iodine from a gas stream, comprising:
   contacting a gas stream comprising gaseous iodine with a sorbent having a layered, non-porous perovskite structure, comprising parallel, alternating layers of:
   an organic layer, comprising an ordered array of organic moieties, wherein the organic moieties comprise terminal alkyne groups; and
   an inorganic layer, comprising a metal-halide sheet,
   wherein each organic layer is sandwiched between inorganic layers,
   wherein the gaseous iodine in the gas stream reacts with the terminal alkyne groups to form covalent C—I bonds.

20. The method of claim 19, wherein the organic moieties comprise but-3-yn-1-ammonium (BYA) ions.

21. The method of claim 19, wherein the gas stream comprises a spent nuclear gas waste stream and the gaseous iodine comprises the $^{129}I$ radionuclide.

22. The method of claim 19, wherein the capture of the gaseous iodine results in an expansion of the sorbent such that a distance between successive inorganic layers is increased.

23. The method of claim 22, wherein the sorbent has a volume that increases by up to about 36 percent following reaction between the gaseous iodine in the gas stream and the alkyne groups.

24. The method of claim 22, wherein the sorbent has a volume that increases by about 25 to about 36 percent following reaction between the gaseous iodine in the gas stream and the alkyne groups.

25. The method of claim 22, wherein the distance between successive inorganic layers increases about 20 to about 40 percent following reaction between the gaseous iodine in the gas stream and the alkyne groups.

26. A method for capturing one or more halogens from a gas stream, comprising:
   contacting a gas stream comprising one or more halogens with a sorbent having a layered, non-porous perovskite structure, comprising parallel, alternating layers of:
   an organic layer, comprising an ordered array of organic moieties, wherein the organic moieties comprise terminal alkene groups capable of reacting with one or more gaseous halogens; and
   an inorganic layer comprising a metal-halide sheet, wherein each organic layer is sandwiched between inorganic layers,
   wherein one or more of the halogens in the gas stream react with the terminal alkene groups to form dihaloalkanes.

27. The method of claim 26, wherein the organic moieties are selected from the group consisting of but-3-en-1-ammonium (BEA) ions, prop-2-en-1-ammonium (PEA) ions, and combinations thereof.

28. The method of claim 26, wherein the gas stream comprises iodine and the dihaloalkanes comprise diiodoalkanes.

29. The method of claim 28, wherein at least a portion of the captured iodine can be released from the sorbent.

30. The method of claim 29, wherein the half-life for release of the captured iodine from the sorbent can be between about 3 hours and about 3 days.

31. The method of claim 26, wherein the gas stream comprises bromine and the dihaloalkanes comprise dibromoalkanes.

32. The method of claim 26, wherein the gas stream comprises both iodine and bromine, and wherein the alkene groups can react with both iodine and bromine to reversibly form diiodoalkanes and to irreversibly form dibromoalkanes and bromoiodoalkanes.

33. The method of claim 32, further comprising outputting a gas, following the contacting step, that comprises a lower overall mole percentage of bromine and a higher overall mole percentage of iodine with respect to the gas stream.

34. The method of claim 26, wherein the capture of the one or more halogens results in an expansion of the sorbent such that a distance between successive inorganic layers is increased following reaction between the gaseous halogens in the gas stream and the alkene groups.

35. The method of claim 34, wherein the distance between successive inorganic layers increases by about 15 to about 40 percent following reaction between the gaseous halogens in the gas stream and the alkene groups.

* * * * *